United States Patent Office 3,288,200
Patented Nov. 29, 1966

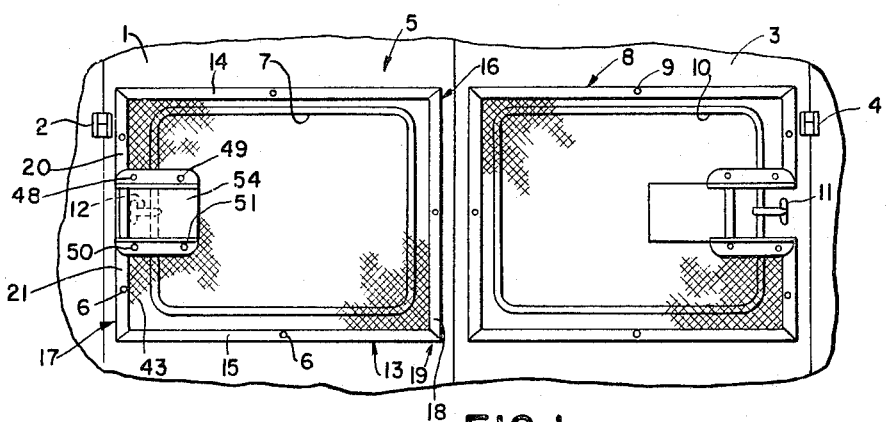

3,288,200
WINDOW SCREENS FOR VEHICLES
Jules A. Gagne, Orange Ave. Extension, Fort Pierce, Fla.
Filed June 8, 1964, Ser. No. 373,371
6 Claims. (Cl. 160—180)

This invention relates generally to window screens attachable to a vehicle to completely cover a window opening thereof, and specifically to such window screens attachable to the inside of a vehicle, the screens having an access opening therein to pass the hand of an occupant of the vehicle, and a closure for the access opening.

The screen of this invention is specifically adapted to be attached to the window frame of a vehicle so that a screen covers the inside of the window and permits normal opening and closing of the window with the screen in place. In some constructions of vehicles, for example the Volkswagen station wagon, the windows of the vehicle are operated by a mechanism located adjacent the side of the window frame and accessible from the inside of the vehicle. In such constructions the window is hinged at its top edge and pivots outwardly when opened. The window screen of this invention is specifically adapted for use with vehicles having such an operating mechanism, although it is to be understood that this screen has other uses.

The window screen of this invention is fabricated completely from sections of extruded material, which is preferably aluminum, to maintain light weight for each screen. Such light weight is quite important for screens attached to a vehicle because of the small mass subjected to dynamic forces which occur when the vehicle is in motion. Since the screen is light in weight relatively small fasteners can be used to secure the screen to the vehicle without danger of damage, to either the screen or the vehicle parts to which it is secured, due to road bounce shock or rapid acceleration or deceleration of the vehicle. The closure for the access opening is similarly very light in weight for the same reasons.

A first object of this invention is to provide a window screen attachable to the inside window frame of a vehicle.

Another object is to provide a window screen for a vehicle made of light weight material which does not corrode under normal atmospheric conditions.

Another object is a window screen with an access opening of unique construction, the access opening being of sufficient size to pass the hand of an occupant of the vehicle.

Another object is a window screen having a unique closure for its access opening, the closure being movable in a plane spaced from the screen material.

Another object is a vehicle window screen with access opening and closure therefrom in which the mass of the moving portions of the closure is maintained at a minimum.

Another object is a vehicle window screen with access opening and closure in which resilient means carried by said closure frictionally maintain said closure in a desired position.

A further object is a vehicle window screen which is economical to manufacture, durable, and easy to remove and install.

The following specification, of which the accompanying drawings form a part, explains the manner in which the foregoing objects are attained in accordance with this invention. In the drawings:

FIG. 1 is a partial view from the inside of a vehicle and shows a pair of the screens of this invention mounted thereon;

FIG. 2 is an enlarged view of a portion of FIG. 1 showing the details of the access opening and closure, and associated screen structure;

FIG. 3 is a partial side elevational view looking toward the edge of the screen where the closure is located;

FIG. 4 is a partial sectional view looking along lines 4—4 of FIG. 2;

FIG. 5 is a partial view in section looking along lines 5—5 of FIG. 2 and also showing a portion of the window operating device for a particular vehicle, and the cooperation of the closure assembly with such device; and FIG. 6 is a fragmentary view showing a frame member joint as viewed from the side of the screen opposite the door.

Referring now to the drawings in detail and particularly to FIG. 1 there is shown the inside of a vehicle having a door 1 that pivots in a horizontal plane about a hinge 2, and a door 3 that pivots in a horizontal plane about a hinge 4. A window screen 5 in accordance with this invention is secured to door 1 with threaded fasteners in the form of self-tapping metal screws 6 to completely cover the window opening 7 of door 1. A window screen 8 identical to window screen 5 is similarly secured with screws 9 to door 3, to completely cover window opening 10. Mounted on door 3 as part of the vehicle, is a window operating mechanism in the form of a toggle device 11 and similarly mounted on door 1 is a window operating mechanism in the form of a toggle device 12.

The remainder of the description herein will be directed to the structure of screen 5, although it is to be understood that that structure of screen 8 is identical to that of screen 5 and can be obtained by turning screen 5 180° in a vertical plane.

As shown in FIG. 1 screen 5 includes a main frame 13 which is generally rectangular in outline configuration and slightly larger than window opening 7 across which the frame extends. Main frame 13 has an upper frame member 14, a lower frame member 15, a first side 16, and a second side 17. First side 16 is a single frame member 18 having its ends mitered as at 19 and connected to similarly mitered ends of upper and lower frame members 14 and 15. Second side 17 is made up of a pair of side members 20 and 21 in aligned relation. The lower end of side member 21 is secured to an end of lower frame member 15 whereas the upper end of side member 20 is secured to an end of upper frame member 14. As shown in FIG. 2 lower end 22 of side member 20 is mitered and is spaced from mitered upper end 23 of side member 21.

As shown in FIGS. 1 and 2 an access opening assembly 24, comprised of a subframe assembly 25 and a closure assembly 26, is secured to side 17 of main frame 13. Subframe assembly 25 includes a first subframe leg 27 secured to end 22 of side member 20 and a second subframe leg 28 connected to end 23 of side member 21 and extending parallel with subframe leg 27 and spaced therefrom. A third subframe leg 29 with mitered ends extends between and is secured to the ends of subframe legs 27 and 28.

Subframe assembly 25 also includes a U-shaped structure 30 defining an access opening 31. The structure at 30 is formed from an extruded length of aluminum channel of C-shaped sectional configuration, the channel having a web 32 and flanges 33 and 34 integral with and extending perpendicular to the web, in the same direction from the web, as best seen in FIG. 3. U-shaped structure 30 has three integral channel sections 35, 36 and 37 each equal in length respectively to the length of subframe legs 27, 28 and 29. U-shaped structure 30 is formed by making a planer cut through flanges 33 and 34 only, but not web 32, at properly spaced intervals, and then bending the web of the sections separated by the cuts at right angles to each other. Structure 30 is secured to legs 27, 28 and 29 by slipping the preformed structure between the opening of legs 27 and 28 with flange 34 in engagement with face 38 of the screen. Structure 30 is then secured to the subframe legs with blind rivets.

Securing with blind rivets is possible because each member of main frame 13 and each subframe leg 27–29 is formed of the same hollow extruded material which is preferably aluminum. As shown in FIG. 4, this extruded member when viewed in side section has a generally rectangular body portion 39 which defines a rectangular opening 40 therein, and an L-shaped side portion 41 integral with the body portion that defines a U-shaped channel 42 in which screen material 43 is secured by a plastic material spline 44. Hence, to connect structure 30 to subframe legs 27–29 it is merely necessary to drill a hole of appropriate diameter through flange 34, drill a similar hole through face 38 only of one of the subframe legs, insert a blind rivet such as rivet 45 and expand its inner end to make a solid connection. It has been found that two rivets like rivet 45 in each of legs 27 and 28 and one rivet in leg 29 is sufficient to secure structure 30 to subframe legs 27–29.

Subframe assembly 25 also includes a pair of spaced apart parallel door mounting members 46 and 47. Member 46 is secured to flange 33 of channel section 35 with rivets 48 and 49, whereas channel section 47 is secured to flange 33 of channel section 36 with rivets 50 and 51. Door mounting members 46 and 47 have U-shaped slots 52 and 53 respectively which are in spaced apart parallel coplanar relation and open toward each other.

Mounted for horizontal sliding movement in slots 52 and 53 is a closure in the form of a door 54 of rectangular outline configuration, door 54 being formed of a thin flat plate of aluminum. As shown in FIGS. 2 and 4 the width of door 54 is sufficient for the door to extend into slots 52 and 53, the slots being so arranged that the inner surface of the door is spaced slightly from the outer face of flange 33 to insure free sliding movement of the door relative to the outer face of flange 33 of channel section 37.

Door 54 forms part of closure assembly 26. As seen in FIG. 2 a front edge 55 of door 54 terminates short of the outer edge of frame members 20 and 21 when the door 54 is closed. Riveted to door 54 is an angle member 56 with a leg 57 engaging the outer surface of the door, and a leg 58 projecting at right angles to the outer surface of the door, the front face of leg 58 being coplanar with edge 55 of the door. A curtain 59 of flexible plastic material which is preferably resilient is secured to the front face of leg 58 by rivets passing through a leg 60 of an angle member 60′ which also has a leg 61 that extends back across the free edge of leg 58. By so clamping curtain 59 between legs 60 and 58 a good connection is assured.

As seen in FIG. 3 the several angle members 56 and 60′ extend between but terminate short of the material of door mounting members 46 and 47 which defines slots 52 and 53. Similarly the portion of curtain 59 secured to the angle members if of a slightly reduced width in the region adjacent door mounting members 46 and 47 but is sufficiently wide beyond this region to frictionally engage the entire inner side surfaces 62 and 63 respectively of channel sections 35 and 36. As shown in FIGS. 3 and 5 curtain 59 is sufficiently long to provide an edge 64 co-planar with the outer face of flange 34. In view of the above it is apparent that closure assembly 26 is comprised of door 54, curtain 59, and the angle members 56 and 60′ which secure the curtain to the door, and also provide a handle to facilitate opening and closing the door.

As best seen in FIG. 5 one end of the material of door mounting members 46 and 47 which form slots 52 and 53 is crimped together as at 65 to limit the movement of door 54 in a direction to the left as viewed in FIG. 5. Stop means in the form of elongated rivets 66, which are used to hold angle member 56 to the door, limit sliding movement of the door in a direction to the right as viewed in FIG. 5. When the elongated ends of these rivets strike surface 66 of channel section 37 the limit of movement of the door to the right is reached. Hence, mounting the closure assembly is a simple matter which merely requires sliding the door into slots 52 and 53 from the left and then crimping the ends of the slots as at 65 to hold the closure assembly in position.

As viewed in FIGS. 3 through 5 it is apparent that structure 30 is effective to space mounting members 46 and 47 from the plane of the main frame. Likewise, door 54 is spaced from and parallel with the plane of the main frame and is slidable in a horizontal direction.

As shown in FIG. 6 each main frame connection, and each subframe leg connection is effected by an L-shaped connector 67 which joins the abutting mitered ends of these frame elements in a well known manner by frictionally engaging the inner surfaces of the frame material defining opening 40 of the frame members. Hence, the several connections as at 19′ secure the frame members together to form a rigid assembly.

The entire portion of the opening defined by main frame 13 is covered with mesh screen material, except access opening 31. Screen material 43 is securely attached to each of the main frame legs with plastic spline 44, and is similarly attached to each of the subframe legs with a similar plastic spline, the spline being pressed into U-shaped channel 42 of the frame members and legs to secure the screen material.

FIG. 5 shows the screen mounted on an automobile of the type that has a window operating toggle device 12 that projects inwardly from the door of the vehicle at a location approximately midway between the upper and lower edges of the window opening. In such a vehicle, if it is desired to open or close the vehicle window, door assembly 26 is slid to the right, and as shown curtain 59 deflects as it passes over toggle to permit the door to be moved to its extreme open position. Window operating toggle 12 can then be manipulated and thereafter door 54 can be closed in a similar manner merely by pushing to the left, curtain 59 deflecting again to pass over window operating member 12. It is to be noted that edge 64 of the curtain engages the surface of vehicle door 1. This provides a seal which completely closes access opening 31 when the door is closed so that bugs and other insects cannot enter the vehicle when door 54 is closed.

When used in other types of vehicles, access opening 31 provides an opening through which the hand and arm of an occupant of a vehicle can pass, for example, to permit paying tolls without opening the door of the vehicle. Since the side edges of the curtain frictionally engage surfaces 62 and 63 this relationship provides a device for maintaining the door 54 in that position to which it is moved manually. Such frictional engagement, and the fact that the curtain is of plastic material provide the further advantage of damping vertical movement of door 54 due to road shock when the vehicle is in motion. Such damping, of course, reduces the possibility of rattles which are frequently objectionable to occupants of the vehicle.

Although a preferred embodiment of the window screen invention has been shown and described with the screen rectangular and the access opening also rectangular, it is to be understood that the frame could be of other configurations which conform with the window opening of the vehicle and that the access opening could be of any convenient shape. The scope of this invention is intended to be limited only in accordance with the appended claims.

What is claimed is:

1. A light weight window screen adapted to be connected to the interior of a vehicle to completely close the vehicle window opening and having provision to accommodate an operating device for the vehicle window which projects inwardly of the vehicle, the screen comprising a main frame defining a frame opening and comprising:

upper and lower spaced apart frame members, and
first and second frame sides connected to and extending between said upper and lower frame members, said first side having a short length thereof removed intermediate said upper and lower frame members to provide a pair of frame side elements with adjacent ends spaced apart;

a generally U-shaped subframe connected to each of said frame elements and extending between the adjacent ends thereof, said subframe comprising:
- a first leg projecting from one of said frame side elements,
- a second leg projecting from the other of said frame side elements, and
- a third leg connected to and extending between said first and second legs;

said third leg being spaced between said first and second frame sides, whereby said subframe defines a U-shaped access opening completely open and unobstructed in a direction away from said second frame side; a closure assembly comprising
- a closure element, and
- a flexible curtain connected to said closure element and extending generally perpendicularly therefrom;

said subframe including means mounting said closure assembly in a plane spaced inwardly of the vehicle window a distance sufficient to accommodate the window operating device of the vehicle, and for sliding movement
- from a first position in which said flexible curtain is spaced from said first frame side and said access opening is open and unobstructed to provide free access to the window operating knob, and
- to a second position in which said flexible curtain closes the open end of said U-shaped access opening via a third position in which said flexible curtain is electrically opened as it passes over the operating knob of the window; and screen material extending between said main frame and said subframe.

2. A vehicle window screen according to claim 1 wherein said flexible curtain, in said second position, seals against an interior surface of the vehicle.

3. A vehicle window screen according to claim 1 wherein said flexible curtain has a width slightly greater than the distance between the side legs of said U-shaped opening to frictionally engage same; whereby, said closure assembly is restrained against unwanted movement by said flexible curtain.

4. A vehicle window screen according to claim 1 wherein said means mounting said closure assembly includes
- a first track on said subframe, and
- a second track on said subframe and parallel to said first track,
- said tracks being disposed in spaced parallel relation to the plane of said main frame; and
said closure element is a flat sheet of light weight material slidably mounted in said tracks.

5. A vehicle window screen according to claim 4 wherein said tracks have a length which is substantially the same as the length of said closure element.

6. A window screen in accordance with claim 1 in which:
- said subframe is located completely within said main frame opening; and
- said closure assembly is movable only within the confines of said main frame opening.

References Cited by the Examiner
UNITED STATES PATENTS

| | | | |
|---|---|---|---|
| 1,736,688 | 11/1929 | Yerby et al. | 160—40 |
| 1,757,896 | 5/1930 | Baron | 160—105 X |
| 2,854,072 | 9/1958 | Winnan | 160—180 |
| 2,860,700 | 11/1958 | Horton | 160—180 |

HARRISON R. MOSELEY, *Primary Examiner.*

REINALDO P. MACHADO, *Examiner.*

P. M. CAUN, *Assistant Examiner.*